(12) United States Patent
Holland

(10) Patent No.: US 8,113,307 B2
(45) Date of Patent: Feb. 14, 2012

(54) ELECTRIC VEHICLE DRIVE SYSTEM

(76) Inventor: Ronald A. Holland, Orange, CA (US)

(*) Notice: Subject to any disclaimer, the term of this patent is extended or adjusted under 35 U.S.C. 154(b) by 909 days.

(21) Appl. No.: 11/870,220

(22) Filed: Oct. 10, 2007

(65) Prior Publication Data

US 2008/0115988 A1 May 22, 2008

Related U.S. Application Data

(60) Provisional application No. 60/859,654, filed on Nov. 17, 2006.

(51) Int. Cl.
*B60K 1/02* (2006.01)
(52) U.S. Cl. ...................... 180/65.1; 180/65.6
(58) Field of Classification Search ............... 180/65.1, 180/65.26, 65.31, 65.6, 242, 243, 908; 192/45
See application file for complete search history.

(56) References Cited

U.S. PATENT DOCUMENTS

| | | | | | |
|---|---|---|---|---|---|
| 3,279,571 | A | * | 10/1966 | Wassilieff | 192/38 |
| 3,361,237 | A | * | 1/1968 | Mathews | 192/45 |
| 3,380,563 | A | * | 4/1968 | Bowers et al. | 192/44 |
| 4,316,132 | A | * | 2/1982 | Geppert | 318/723 |
| 4,335,429 | A | * | 6/1982 | Kawakatsu | 701/102 |
| 5,343,971 | A | * | 9/1994 | Heidelberg et al. | 180/65.245 |
| 5,419,406 | A | * | 5/1995 | Kawamoto et al. | 180/65.6 |
| 5,887,674 | A | * | 3/1999 | Gray, Jr. | 180/307 |
| 5,934,397 | A | * | 8/1999 | Schaper | 180/65.245 |
| 6,617,704 | B2 | * | 9/2003 | Tomikawa | 290/40 C |
| 6,895,835 | B2 | * | 5/2005 | Cordeiro | 74/665 A |
| 2004/0069548 | A1 | * | 4/2004 | Kira et al. | 180/65.3 |

* cited by examiner

*Primary Examiner* — Frank Vanaman
(74) *Attorney, Agent, or Firm* — Kenneth L. Green

(57) ABSTRACT

An electric powered vehicle includes a first drive unit and a second drive unit. The first drive unit and the second drive unit are coupled to one of the drive wheels. At its maximum power within the system, the second drive unit drives the vehicle at a higher speed than the first drive unit. A clutch automatically disengages the first drive unit from the drive wheel while the second drive unit is operating. The clutch may include a uni-directional device. An electronic control unit automatically adjusts the voltage supplied to the second drive unit to maintain the efficiency of the second electric drive unit within a predetermined efficiency range.

11 Claims, 6 Drawing Sheets

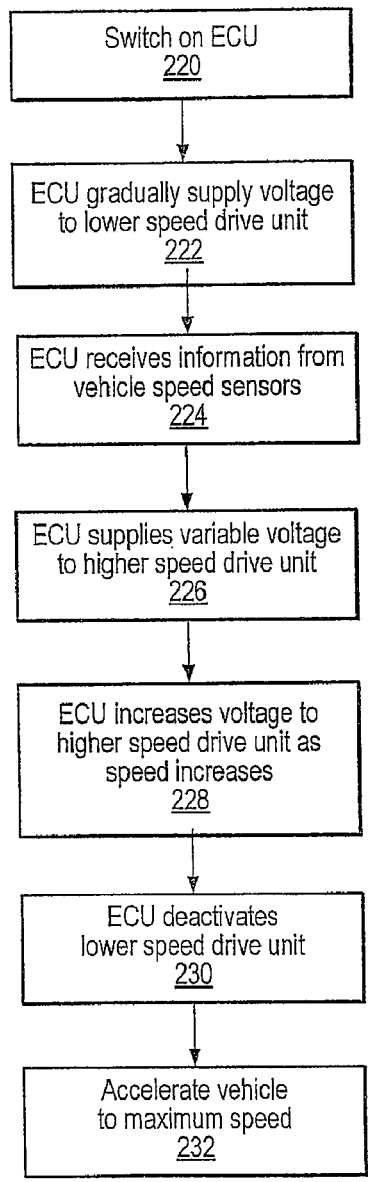
FIG. 8
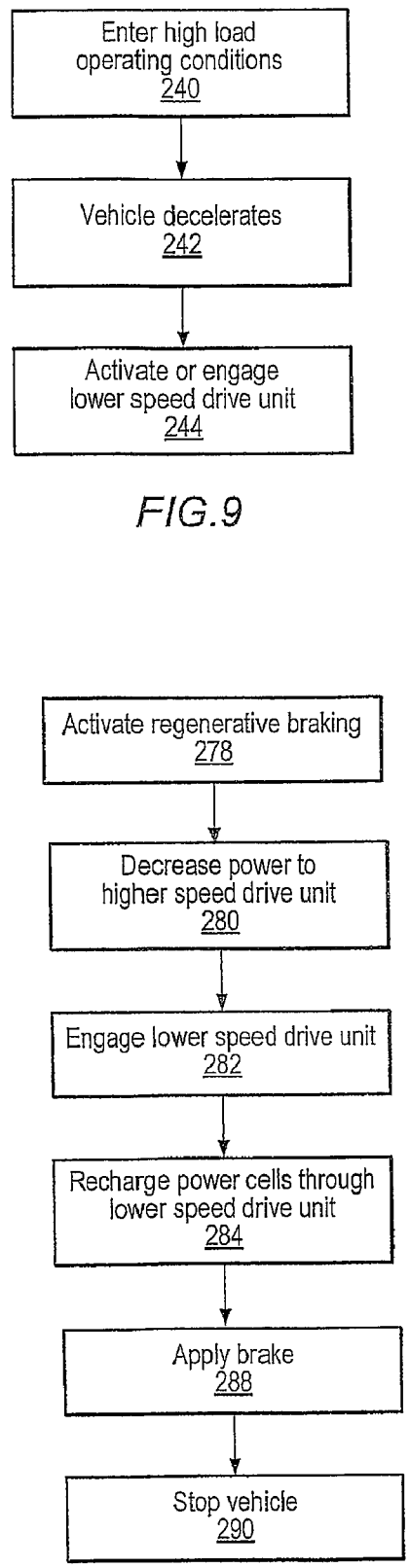
FIG. 9
FIG. 10

ELECTRIC VEHICLE DRIVE SYSTEM

PRIORITY CLAIM

This application claims priority to U.S. Provisional Patent Application Ser. No. 60/859,654 filed on Nov. 17, 2006, entitled "ELECTRIC VEHICLE DRIVE SYSTEM", the disclosure of which is hereby incorporated by reference.

BACKGROUND

1. Field of the Invention

The present invention relates in general to electric powered vehicles (EVs), and more particularly to a new, improved drive train technology for these vehicles.

2. Description of Related Art

There are currently many different types of highly efficient electric motors available for use in EVs. Nevertheless, in any given electric motor, at a given voltage, high efficiency may only exist in the upper speed range of the motor at light loads. As the load (required torque) is increased above this range, the required current increases in proportion to load, but even with a constant voltage source the speed of the motor decreases rapidly with the increase in load. Therefore, the required electrical input power to the motor (the current multiplied by the voltage) will increase at a greater rate than the mechanical output power from the motor (the torque multiplied by the speed of the motor). This results in a continuing loss of efficiency (output power divided by input power) as the load increases and the speed decreases. The efficiency of these types of electric motors used on EVs is highest when it is at higher speeds under lower loads and lowest when at low speeds under high loads, gradually dropping down to zero at stall.

If driven correctly, EVs with manual transmissions and enough gear changes can be operated more efficiently over a wide range of speeds, for example, by shifting at the right time to consistently keep the motor at high speed. But, perhaps based on habits learned from operating vehicles with manual transmissions and internal combustion (I.C.) engines, most drivers do not shift manual transmissions on EVs correctly; they shift too soon keeping the motor at low speed and high load. The efficiency characteristics of I.C. engines are generally opposite to those of the electric drive motors previously discussed; the efficiency of most I.C. engines is highest under high loads and medium speeds, and lowest under low load and higher speeds. There is a strong tendency for drivers to manually shift EVs like their I.C. counter parts, which reduces the efficiency and can overheat the electric motor and its controller.

Multi-speed transmissions like the ones used in today's I.C. engine vehicles with five or six constant mesh gears and corresponding syncromesh rings and clutches create a significant amount of drag and lower the range of an electric powered vehicle. The automatic versions with hydraulic torque converters are even less efficient and can be too inefficient to use in EVs.

It is desirable to have an electric vehicle drive system that automatically changes the ratio of the speed of the driving motor(s) to the drive wheel/s to keep the motors of the drive system operating more efficiently.

SUMMARY

Various embodiments of electric vehicles, drive systems and related apparatus, and methods of operating electric vehicles are described. In one embodiment, a vehicle incorporates at least two electric motors operatively connected to a shaft. The shaft is, in turn, operatively connected to at least one drive wheel of the vehicle. One motor is connected to the shaft through a bi-directional motor drive (BMD) unit and all other motors through unidirectional motor drive (UMD) units. The motors and gearing are such that if the same voltage is applied to each motor drive unit independently, the maximum speed of the vehicle when driven by the BMD unit is greater than when driven, under the same conditions (e.g., on level ground, etc.), by each of the UMD units, and the maximum speed of the vehicle when driven, under the same conditions, by each consecutive UMD unit is greater than that of the next unit, continuing through to the last drive unit. A unidirectional device (e.g., roller clutch bearing) in each of the UMD units allows the next higher speed drive unit to drive the shaft faster than the other lower speed drive unit/s without unnecessary drag and loss of efficiency. The unidirectional device in each UMD unit can automatically disengage the drive unit from the shaft whether or not the drive unit is running (e.g., whether or not the drive motor is turning). A control unit applies power to two or more of the drive units of the vehicle to accelerate the vehicle from a standing start.

In one embodiment, a control unit accelerates the vehicle by applying up to full voltage to the lowest speed drive unit and applying variable voltage to the other drive unit/s. The variable voltage on the other drive units is a function of the position of a manual speed control device (e.g., an accelerator pedal) and the speed of the vehicle.

In an embodiment, voltage supplied to at least one drive unit of a vehicle is controlled to keep the efficiency of the drive unit within a predetermined efficiency range. The at least one drive unit may be the high-speed motors of a drive system. When the manual speed control is held at maximum, and the vehicle is at rest, fall voltage is applied to the lowest speed drive unit. The voltage applied to the other drive unit/s is variable and increases as the speed of the vehicle increases. Each drive unit is kept within a predetermined high efficiency range. When the lowest speed drive unit reaches a predetermined speed, the voltage to it is turned off as the next higher speed drive unit receives full voltage. This process may be continued until the highest speed drive unit receives full voltage.

Another embodiment is similar to the first except that at least one of the uni-directional devices is replaced by an electrically operated clutch. The clutch can be disengaged when the motor is turned off. The clutch serves the same function of disengaging the drive unit as the uni-directional device. When the brakes are applied at higher speeds, the electrically operated clutch is engaged so as to overdrive the respective motor and to generate electric power for recharging the battery and/or operating the brake lights.

In an embodiment, voltage to electric motors of a drive system is controlled by an electronic control unit (ECU). The ECU varies the average applied voltage to each motor. The voltage applied to each motor is determined by the ECU from input signals supplied by a manual speed control and/or by sensors supplying a signal that is a function of the speed of the vehicle. In one embodiment, the voltage is applied as a function of the speed of the vehicle. The voltage is increased as the speed of the vehicle increases. When the speed of the vehicle exceeds a predetermined limit, such that a motor can no longer efficiently drive the vehicle, the voltage to the motor is turned off. The motor can be turned back on by the ECU as needed when the vehicle drops below a predetermined speed.

BRIEF DESCRIPTION OF THE DRAWINGS

Advantages of the present invention will become apparent to those skilled in the art with the benefit of the following detailed description and upon reference to the accompanying drawings in which:

FIG. 8 is a flow chart of acceleration of a two drive-unit vehicle with variable voltage to drive units according to one embodiment.

FIG. 9 is a flow chart of deceleration of a vehicle under high load conditions according to one embodiment.

FIG. 10 is a flow chart of regenerative braking with electric clutch engagement of a lower speed drive unit according to one embodiment.

Figure 1:
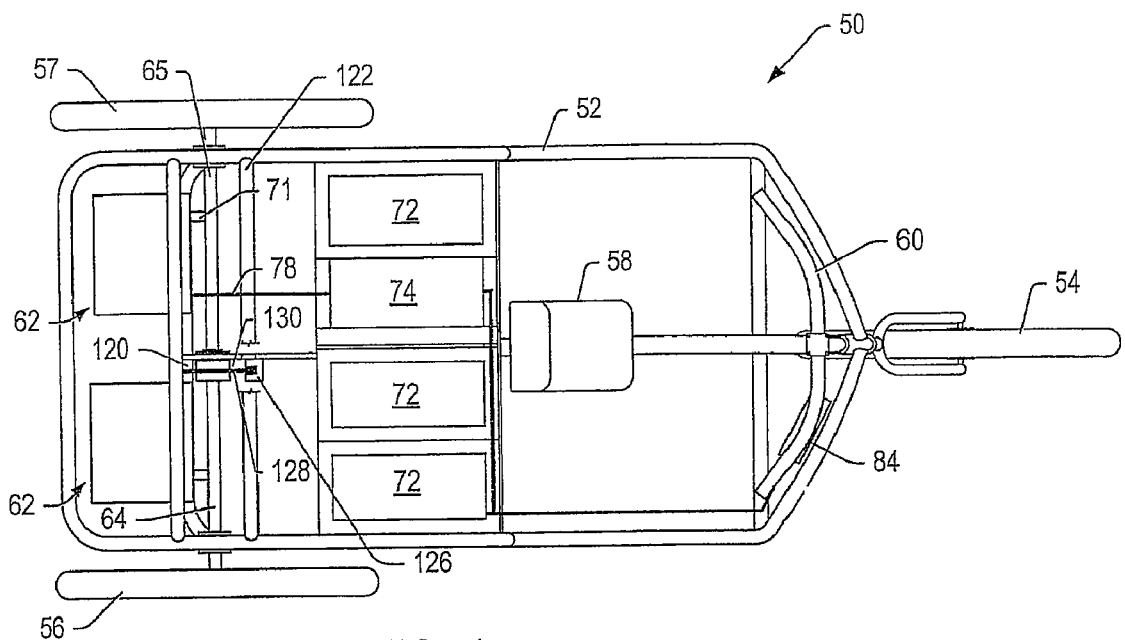
FIG. 1 is a top view illustration of a three-wheeled vehicle including electric drive systems according to one embodiment.

While the invention is susceptible to various modifications and alternative forms specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF ILLUSTRATIVE EMBODIMENTS

A first preferred embodiment incorporates at least two electric motors operatively connected to a shaft within the frame of a vehicle. The motors are of a high efficiency type. The shaft is, in turn, operatively connected to at least one drive wheel of the vehicle through appropriate gearing. One motor is connected to the shaft through a bi-directional motor drive (BMD) unit and all other motors through unidirectional motor drive (UMD) units. The bi-directional motor drive unit can drive the shaft forward or the shaft can drive the motor forward through the bi-directional motor drive unit for regenerative braking. In this embodiment, the shaft cannot drive the motors forward through the uni-directional motor drive unit but the uni-directional motor drive (UMD) units can drive the shaft forward. In this embodiment, the motors and gearing are selected and arranged such that if the same voltage is applied to each motor drive unit independently, the maximum speed of the vehicle when driven by the BMD unit is significantly greater than when driven, under the same conditions (e.g., on level ground, etc.), by each of the UMD units, and the maximum speed of the vehicle on level ground when driven, under the same conditions, by each consecutive UMD unit is significantly greater than that of the next unit, continuing through to the last drive unit. A unidirectional device (e.g., roller clutch bearing) in each of the UMD units allows the next higher speed drive unit to drive the shaft faster than the other lower speed drive unit/s without unnecessary drag and loss of efficiency. The unidirectional device for each UMD unit can automatically disengage the drive unit from the shaft while the drive unit is operating (e.g., while the drive motor is running).

In the first preferred embodiment, the vehicle can be accelerated from rest up to its top speed quickly and efficiently by applying up to full voltage to the lowest speed drive unit and variable voltage to the other drive unit/s. This variable voltage is a function of the position of the manual speed control and the speed of the vehicle. If the manual speed control is held at maximum, and the vehicle is at rest, full voltage is applied to the lowest speed drive unit. The voltage applied to the other drive unit/s is increased as the speed of the vehicle increases. Each motor is kept within a predetermined high efficiency range. When the lowest speed drive unit reaches a predetermined speed (which can be, e.g., a little lower than its free speed), the voltage to it is turned off as the next higher speed drive unit receives full voltage. This process may be continued until the highest speed drive unit receives full voltage. Each motor remains turned off until the vehicle slows down to a predetermined speed (e.g., a little lower than the speed at which it is set to be turned off during acceleration). If the manual speed control is held at a predetermined position that is less than the maximum position, the extra power supplied by the higher speed drive units may not be required.

A second preferred embodiment is similar to the first except that at least one of the uni-directional devices is replaced by an electrically operated clutch. The clutch can be disengaged when the motor is turned off. In certain embodiments, when the brakes are applied at higher speeds, the electrically operated clutch is engaged so as to overdrive the respective motor and to generate electric power for recharging the battery and/or operating the brake lights.

In some embodiments, a bi-directional electrically operated clutch is used in place of a uni-directional device so that the polarity of the motor can be reversed for reversing the direction of operation of the vehicle.

In some embodiments, voltage to electric motors in a vehicle is controlled by an electronic control unit (ECU). The ECU may use the voltage supplied by batteries. The ECU can vary the average voltage applied to each motor. An average voltage may be an average of the applied voltage over a specified period, such as $1/100$ of a second. The voltage applied to each motor is determined by the ECU from input signals supplied by a manual speed control and/or by sensors supplying a signal that is a function of the speed of the vehicle. A speed sensor can include, for example, a magnet attached to a turning shaft (e.g., jack-shaft) and a magnetic pickup attached to a fixed mount relative to the vehicle frame (e.g., a support frame for a drive system). The speed sensors send electrical pulses to the ECU. In some embodiments, hub motors include Hall sensors. Signals from the Hall sensors are used to determine the speed of the vehicle. When the speed of the vehicle exceeds a predetermined limit, such that a motor can no longer efficiently drive the vehicle, the voltage to the motor is turned off. The motor is turned back on by the ECU as needed when the vehicle drops below a predetermined speed. In one embodiment, the predetermined speed is lower than the speed at which it was set to be turned off during acceleration.

In some embodiments, the voltage to the motors is turned off when a brake is applied by the operator. Power generated by the motors, back driven by the wheel, can be applied to the ECU. This power can be rectified and transformed as necessary, for example, by a high speed switching DC-to-DC converter, and fed back to the electric power source to charge it (e.g., regenerative braking).

Figure 2:
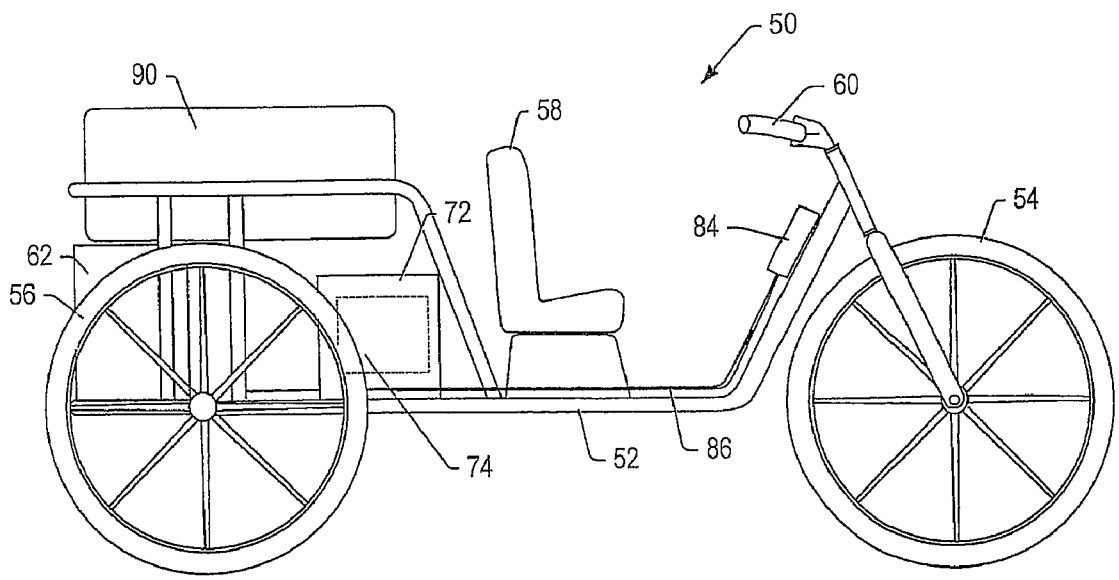
FIG. 2 is a side view illustration of a three-wheeled vehicle including electric drive systems according to one embodiment.

FIGS. 1 and 2 depict a three-wheeled vehicle having multiple electric drive units according to one embodiment. Vehicle 50 includes frame 52, front wheel 54, and rear wheels 56 and 57. Seat 58 is attached to frame 52. Steering bar 60 is coupled to front wheel 54. Steering bar 60 may be operable to turn front wheel 54 left and right.

Vehicle 50 includes drive systems 62. Drive systems 62 are coupled to axles 64 and 65. Left and right rear wheels 56 and 57 are each coupled to one of axles 64 and 65.

Figure 1A:
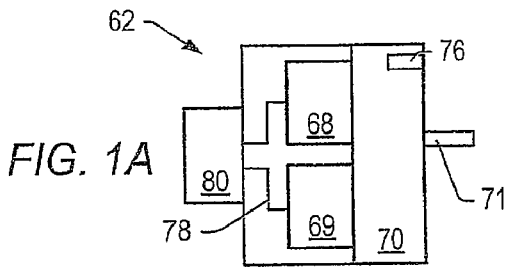
FIG. 1A is a schematic diagram of a multi-drive unit system according to one embodiment.

FIG. 1A depicts a schematic diagram of a drive system according to one embodiment. Each drive system 62 includes drive units 68 and 69 and jack-shaft assembly 70. In one embodiment, drive unit 68 is a low-speed drive unit and drive unit 69 is a high-speed drive unit. Drive units 68 and 69 are each coupled to one of jack-shaft assemblies 70.

Referring again to FIG. 1, batteries 72 and ECU 74 are coupled to drive units in drive systems 62. The drive units are operably coupled to one or more shafts in jack-shaft assemblies 70 (See FIG. 1A). Jack-shaft assemblies 70 are operably connected to final drive units 71. Final drive units 71 may be, for example, a chain connecting drive system 62 to a 25 sprocket on the axle. Final drive units 71 turn rear axles 64 and 65 and rear wheels 56 and 57. Rotation of rear wheels 56 and 57 will move vehicle 50 on a road surface.

Batteries 72 are coupled to drive units 68 and 69. Batteries 72 include one or more cells. Batteries 72 supplies electrical power to drive units 68 and 69 (see FIG. 1A). ECU 74 may regulate voltage from batteries 72 to drive units 68 and 69. Drive units 68 and 69 are connected to at least one electronic control unit (ECU) (e.g., ECU 74). Drive units 68 and 69 are connected to ECU 74 through cables 78 and junction boxes 80 (see FIG. 1A).

Each wheel or drive assembly can include one or more speed sensors. Referring to FIG. 1A, for example, each drive system 62 includes speed sensor 76. Speed sensors 76 are connected to ECU 74 with suitable cables and wiring. Speed sensor 76 provides speed data (e.g., velocity data, acceleration data) to ECU 74. ECU 74 uses speed data from speed sensors 76 in regulating voltage to drive units 68 and 69.

Control panel 84 is connected to ECU 74 through cable 86 (see FIG. 2). Control panel 84 is operable by a driver in seat 58. Suitable controls for vehicle 50 include knobs, foot pedals, switches, dials, levers, and other manual control devices.

Vehicle 50 includes brake system 120. Brake system 120 is coupled to rear axles 64 and 65. Brake system 120 is operable to brake vehicle 50. A driver may operate brake system 120 through control panel 84, a separate brake pedal, or another control device.

Cargo container 90 is attached to frame 52 (cargo container is omitted from FIG. 1 for clarity). Cargo container 90 can support or contain various objects and/or material that are to be transported in vehicle 50. In some embodiments, a vehicle includes passenger seating instead of, or in addition to, cargo container 90.

Figure 3:
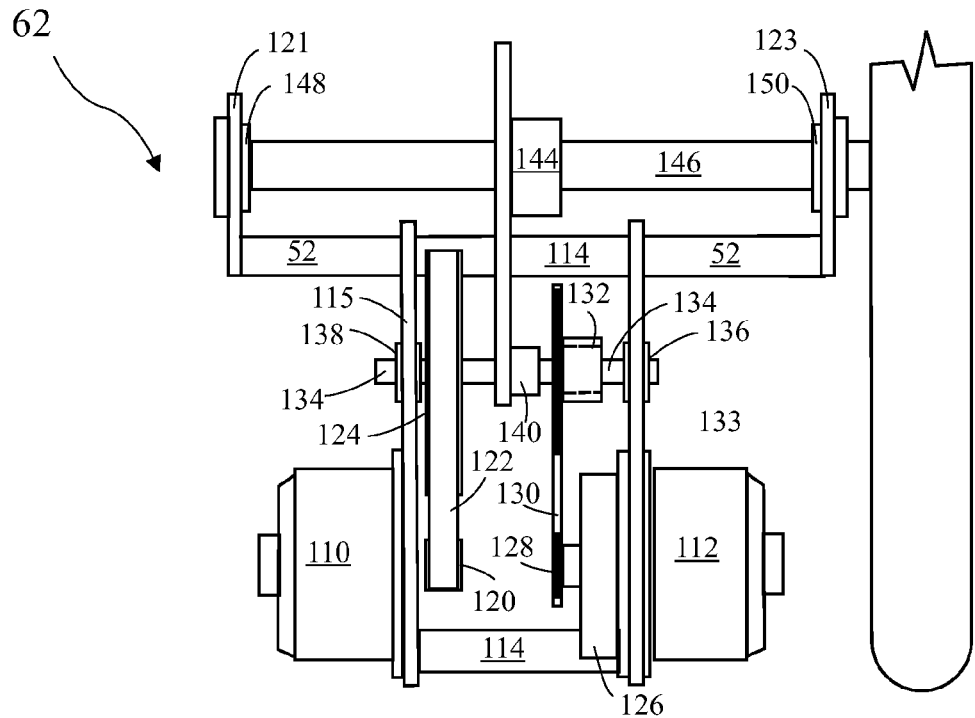
FIG. 3 is an illustration of an electric powered drive system for a vehicle including two separate electric drive units connected to one wheel of the vehicle, exemplifying a preferred embodiment of the present invention.

FIG. 3 depicts a drive system of a vehicle having multiple drive units according to a preferred embodiment. Drive system 62 is coupled to frame 52 of the vehicle. Frame 114 of the drive system is attached to frame 52. Frame 114 includes mounting plates 115 and 117. Frame 114 supports two electric drive units 106, 108 and the drive sprocket 140 of the final drive to axle 146.

High speed drive unit 106 includes motor 110, pulley 120, pulley 124, belt 122, and jack-shaft 134. Pulley 120 is mounted to an output shaft of motor 110, and belt 122 is connected around pulleys 120 and 124. Pulley 124 is mounted to jack-shaft 134. Jack-shaft 134 is rotatably mounted in frame 114 by bearings 136 and 138. In one embodiment, high speed drive unit 106 has a reduction of about five to one, so that when motor 110 is turning at about 5,000 RPM, motor 110 is driving jack-shaft 134 at about 1,000 RPM.

Low speed drive unit 108 includes motor 112, transmission 126, sprocket 128, chain 130, and sprocket 132. Transmission 126 can in certain embodiments be a planetary transmission. For example, an output shaft of motor 112 can drive a sun gear of transmission 126. Sprocket 128 is mounted to an output shaft of transmission 126. Chain 130 is connected around sprockets 128 and 132. Roller clutch bearing 133 can be pressed into the hub of sprocket 132. Roller clutch bearing 133 can act as a bearing and not drive sprocket 132. Sprocket 132 operates on jack-shaft 134 (in FIG. 3, jack-shaft 134 is indicated in two places along its length for clarity). In one embodiment, jack-shaft 134 is case hardened and ground. In one embodiment, low speed drive unit 108 has a reduction of about ten to one. For example, transmission 126 can provide a reduction of about five to one and the chain drive can about another two to one, producing a total reduction of about ten to one for low speed drive unit 108.

Figure 3A:
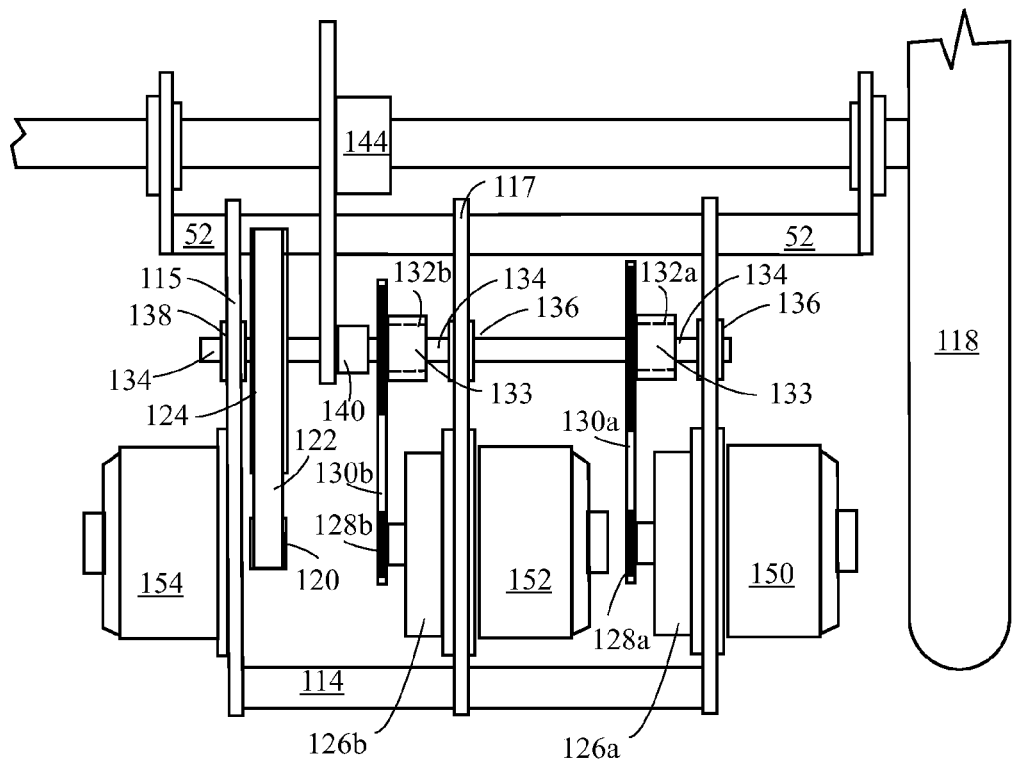
FIG. 3A is an illustration of an electric powered drive system for a vehicle including three separate electric drive units connected to at least one wheel of the vehicle, exemplifying a preferred embodiment of the present invention.

Motors 110 and 112 can be electric motors. In one embodiment, motors 110 and 112 are permanent magnet electric motors. Permanent magnet electric motors may obviate a need to electrically energize coils for a motor. Motors 110 and 112 can be the same or different. Although drive system shown in FIG. 3 has two drive units, a drive system in other embodiments can include three drive units as shown in FIG. 3A, four drive units, or more than four drive units.

Roller clutch bearing 133 drives jack-shaft 134 when motor 112 turns sprocket 132 in the forward direction faster than jack-shaft 134. Roller clutch bearing 133 acts as a bearing and not drive sprocket 132 forward when jack-shaft 134 is turning faster than sprocket 132. This allows high speed drive unit 106 to continue to drive the vehicle up to full speed after low speed drive unit 108 reaches its full speed without having to drag low speed drive unit 108 up to what may be an unacceptable speed, and reduce the efficiency of the drive system.

Drive axle 146 is rotatably mounted In a portion of the vehicle's frame 52 through bearings 148 and 150 and drives one of the vehicle's wheels 118. Plates 121 and 123 support bearings 148 and 150, respectively, on frame 52. Frame 114 is rigidly mounted to frame 52 and sprocket 140 is fixedly mounted to jack-shaft 134. Sprocket 144 is fixedly mounted to axle 146 and chain 142 is connected around sprockets 140 and 144 so that when either motor 110 or 112, or both motors 110 and 112, drive sprocket 140 forward wheel 118 and consequently the vehicle is driven forward.

In some embodiments two motors or more motors of a drive system are the same. For example, in the vehicle described with reference to FIG. 3 above, with the maximum system voltage applied, motors 110 and 112 can both have a no-load speed of about 6,000 RPM and attain maximum efficiency at about 5,000 RPM. Therefore, because of the differences in drive ratios of about 2-to-1, both motors can drive the vehicle up to about half of its maximum speed where motor 112 can be turned off and motor 110 can take the vehicle up to full speed efficiently. Many other reduction ratios, speed ratings, and motor sizes may be suitable.

FIG. 3A shows a first drive unit 150, a second drive unit 152, and a third drive unit 154. The first drive unit 150 is coupled to at least one drive wheel 118 to drive the vehicle. The second drive unit 152 is also coupled to at least one drive wheel 118, and at its maximum power within the system under the same conditions, the second drive unit 152 drives the vehicle at a higher speed than the first drive unit 150. The third electric drive unit 154 is also coupled to at least one the drive wheel 118 and at its maximum power within the system under the same conditions, the third drive unit 154 drives the vehicle at a higher speed than the second drive unit 152. A first clutch 133a is configured to automatically disengage the first drive unit 150 from the drive wheel 118 when the speed of the wheel exceeds the speed of the first drive unit. A second clutch 133b is configured to automatically disengage the second drive unit 152 from the drive wheel 118 when the speed of the wheel exceeds the speed of the second drive unit. An ECU is configured to apply first voltages to all three drive units to drive the vehicle from a standing start up to a first speed, and apply second voltages to the second and third units to drive the vehicle up to a second speed, and apply a third voltage to the third drive unit to drive the vehicle up to a third speed that is higher than the second speed. The transmissions 126a and 126b, sprockets 128a and 128b, chains 130a and 130b, and sprockets 132a and 132b perform in similar fashion as the corresponding transmission 126, sprocket 128, and sprocket 132 in FIG. 3. The sprockets and transmissions are configured to provide the appropriate gear ratios for the first drive unit and second drive unit, and the ECU automatically adjusts the voltages supplied to the first drive unit, the second drive unit, and the third drive unit to maintain the efficiency of the drive units.

Figure 4:
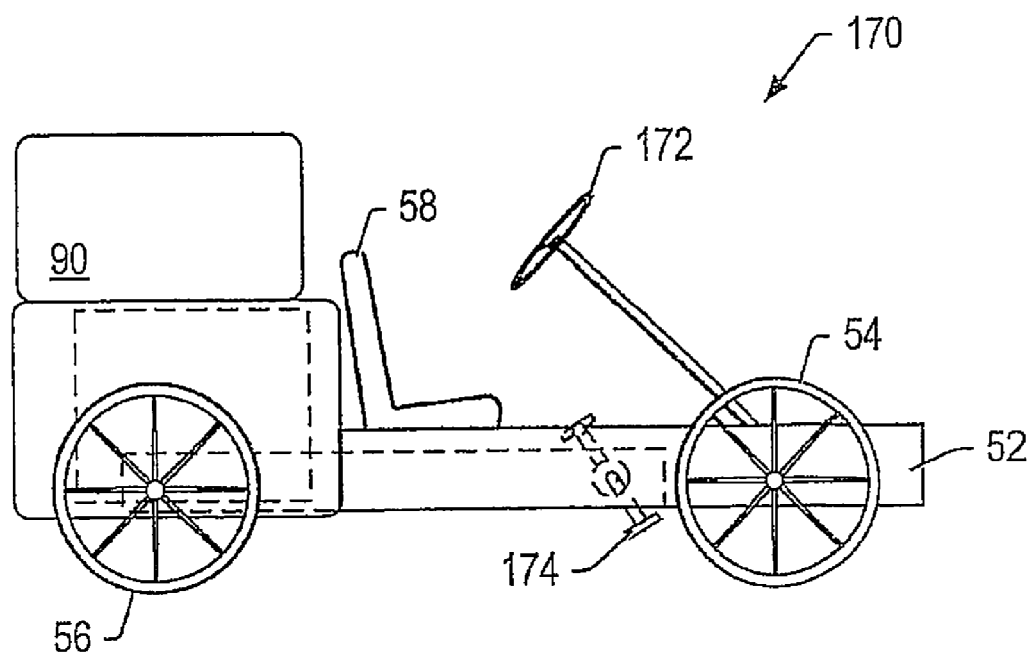
FIG. 4 is a side view illustration of a four-wheeled vehicle with a pedal system according to one embodiment.
Figure 5:
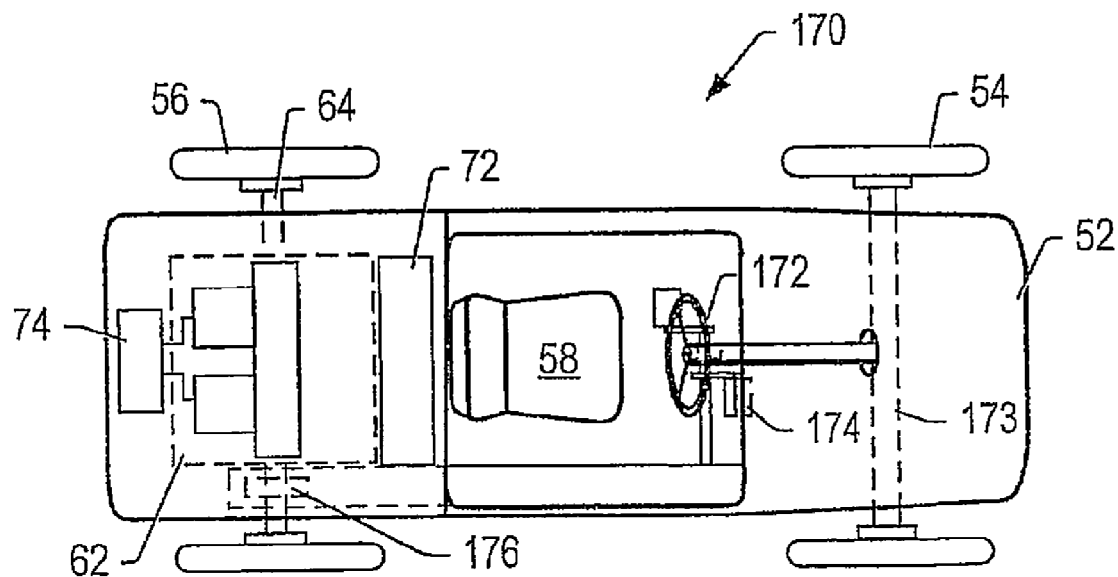
FIG. 5 is a top view illustration of a four-wheeled vehicle with a pedal system according to one embodiment.

FIGS. 4 and 5 depict a four-wheeled vehicle having multiple electric drive units and a pedal drive system according to one embodiment. Vehicle 170 includes frame 52, front wheels 54, and rear wheels 56. Seat 58 is coupled to frame 52. Steering wheel 172 is coupled to front wheels 54 through steering linkage assembly 173. Steering wheel 172 is operable to turn front wheels 54 left and right. Drive system 62 is coupled to frame 52. Drive system 62 is operable to drive rear wheels 56.

Pedal crank 174 is coupled to rear axle 64 through clutch device 176. In one embodiment, clutch device 176 is a roller clutch bearing. Clutch device 176 can allow the motors to be operated and drive the vehicle without turning pedal system 174.

Referring again to FIG. 3, a clutch device is connected between pulley 24 and shaft 34 to allow the vehicle to be pedaled when motors 110 and 112 are turned off without turning either one of drive units 106 and 108. Alternatively, pedals is operated at the same time the electric motors are driving a drive shaft. Pedaling during operation of the electric drive system is used to augment power or speed of the vehicle, for example, during hill climbing. In one embodiment, a pedal system is geared to provide power to a vehicle at low speeds (e.g., for extra hill climbing power). In one embodiment, a rider operates a pedal system to reduce loads on a drive system accelerating from a standing start. In certain embodiments, an ECU for a drive system automatically maintains a drive unit within an acceptable efficiency range while a rider operates a pedal system coupled to a drive axle.

Although the drive systems in FIGS. 1, 2, 4 and 5 are shown connected to drive rear wheels, drive systems can in other embodiments drive one or more front wheels of a vehicle. For example, one or more drive systems can, in certain embodiments, drive all the wheels of a vehicle. For example, in some embodiments, two or more drive systems on a four-wheeled vehicle drive a common jack-shaft, and the jack-shaft drives axles on all of the wheels of the vehicle. In another embodiment, a vehicle includes a first shaft that drives both left and right axles on the front of a vehicle, and a second shaft that drives both the left and right axles on the rear of the vehicle. Different speed drive units (e.g., high, low, medium) can be used on different wheels (e.g., left and right, front and rear).

Figures 6, 7:
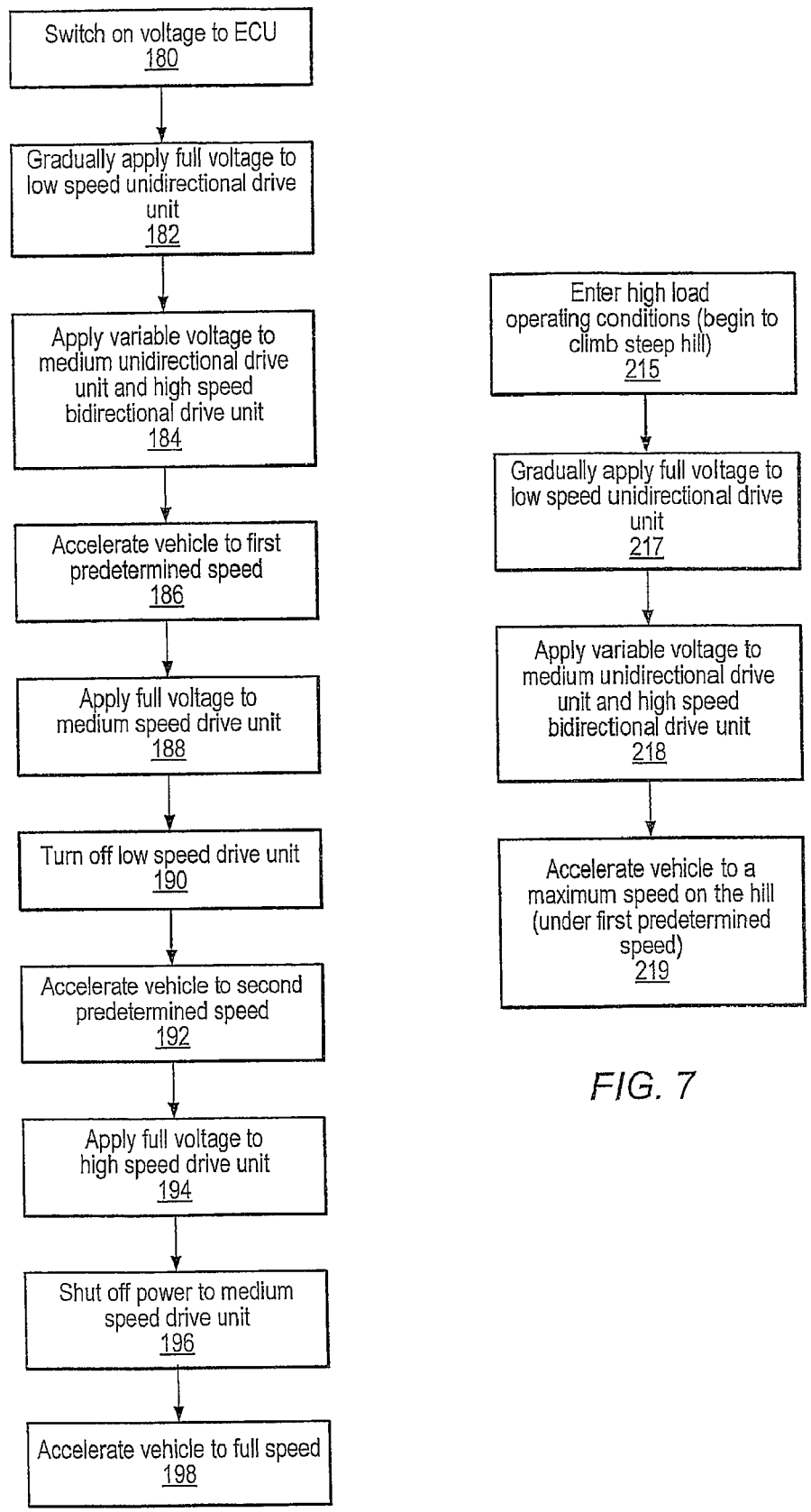
FIG. 6 is a flow chart of acceleration of a three drive-unit vehicle at a maximum speed setting according to one embodiment.
FIG. 7 is a flow chart of acceleration of a three drive-unit vehicle at a maximum speed setting under high operating loads according to one embodiment.

FIG. 6 depicts acceleration of a three-drive unit vehicle at a maximum manual speed setting according to one embodiment. In 180, voltage is switched on to the ECU. In 182, full voltage may gradually be applied to the low speed drive unit. In 184, variable voltage is applied to the medium speed uni-directional drive unit and high speed bi-directional drive unit. The variable voltage is a function the speed of the vehicle. In 186, the vehicle is allowed to accelerate to a first predetermined speed. In 188, full voltage is applied to a medium speed uni-directional drive unit. In 190, voltage to the low speed drive unit is turned off. For example, voltage to the low speed drive unit is turned off as the medium speed drive unit receives full voltage. In 192, the vehicle is allowed to accelerate to a second predetermined speed. In 194, full voltage is applied to a high speed uni-directional drive. In 196, voltage to the medium speed drive unit is turned off. In one embodiment, voltage to the medium speed drive unit is turned off as the high speed drive unit receives full voltage. In 198, the vehicle is allowed to accelerate to fall speed.

In some embodiments, voltage to one or more drive units of a vehicle is variable. Voltage can vary, for example, as a function of speed of the vehicle or a component thereof (e.g., the speed of a drive shaft). Speed information can, in some embodiments, be received by an ECU from speed sensors (e.g., on a wheel or a drive shaft) and used by the ECU in regulating voltage to the drive units.

FIG. 7 depicts acceleration of a three-drive unit vehicle at a maximum speed control setting under high-load operating conditions according to one embodiment. In 215, a vehicle may enter a high-load operating condition, such as climbing a steep hill. In 217, an ECU applies full voltage is applied to the low speed drive unit. In 218, an ECU applies variable voltage to one or more higher speed drive units. In 219, the vehicle undergoes acceleration. The higher speed drive units in FIG. 7 may not be brought up to full power, even though the control device is set to the maximum setting, because the high load conditions may prevent the vehicle from achieving higher speeds. Each of the motors of the drive units remains within a high efficiency range because the motors are assisting each other. In this embodiment, the hill might be so steep that the maximum speed of the vehicle is less than a first predetermined speed (e.g., the speed the vehicle would attain on level ground). All active drive motors, however, stay with at or close to their maximum efficiency, or within target efficiency range.

FIG. 8 depicts automatic operation of a two-drive unit vehicle using variable voltage according to one embodiment. In 220, an ECU may be switched on. In 222, voltage is gradually supplied to a lower speed electric drive unit. In 224, information from vehicle speed sensors is received by an ECU. In 226, voltage is supplied to a higher speed drive unit.

In 228, an ECU increases voltage to the higher speed drive unit as the vehicle accelerates. For example, from a standing start, the lower speed drive unit quickly receives full voltage. The higher speed drive unit may initially receive zero voltage. As the vehicle accelerates, voltage to the higher speed drive unit is increased as a function of the speed of the vehicle. In one embodiment, the voltage to a motor is increased linearly as the speed of the vehicle increases for at least a portion of an acceleration phase. For example, a voltage is increased linearly as a function of vehicle speed for the first half of an acceleration phase. In some embodiments, voltage to both a lower speed electric drive unit and a higher speed electric drive unit is increased as a function of the vehicle speed (e.g., with voltage increasing as the vehicle accelerates).

In certain embodiments, voltage to a drive unit for a vehicle is controlled to keep its motor(s) in a desired efficiency range. On-off switches, variable voltage controls, or a combination thereof can be used to increase efficiency of the drive unit. For example, an ECU may control the voltage applied to a higher speed drive unit (e.g., a drive unit having a relatively small reduction ratio) as a function of speed. Controlling voltage as a function of speed is used to maintain the motor in a desired efficiency range. For example, an ECU can be programmed not to provide full voltage to a higher speed drive unit until the vehicle reaches a speed of at least 15 kilometers per hour.

In some embodiments, a drive unit is disengaged and shut off, or receive reduced voltage, when the drive unit moves out of a desired efficiency range. For example, a drive unit motor may be shut off when the motor exceeds a predetermined RPM, at which its efficiency drops below a predetermined value. Referring again to FIG. 8, in 230, an ECU is programmed to shut off and disengage, or reduce voltage to, the lower speed drive unit (e.g., a drive unit having a relatively large reduction ratio) when the vehicle accelerates above a predetermined speed. For example, an ECU may deactivate and disengage a lower speed drive unit when the vehicle reaches a predetermined speed (e.g., 15 kilometers per hour). Deactivating and disengaging a drive unit when the drive unit is in a low efficiency range can improve overall efficiency of a vehicle. In 232, the vehicle is accelerated to its target speed.

FIG. 9 depicts deceleration of a two-drive unit vehicle under high-load operating conditions according to one embodiment. In 240, a vehicle enters a high-load operating condition, such as climbing a hill. In 242, the vehicle decelerates under the high loads. In 244, a lower speed drive unit is activated. The lower speed drive unit may be activated as the vehicle reaches the predetermined speed during deceleration. In one embodiment, a predetermined speed for turning on the lower speed drive unit during deceleration is slightly lower than the speed at which the lower speed drive unit was turned off and disengaged during acceleration. For example, a lower speed drive unit that was turned off and disengaged at 15 km per hour during acceleration can be turned on and re-engaged at 14 km per hour during deceleration.

A multi-motor drive system in which electric motors are controlled to operated within high efficiency ranges can provide for more efficient hill climbing and higher efficiency under heavy loads over a wide range of vehicle speeds, simply and automatically.

Control of a drive system can be performed by program instructions in an ECU, by manual control, or by a combination thereof. In one embodiment, control of a drive system for a vehicle is accomplished using a computer program. The program instructions are executed in an ECU or in another device, such as a central computer system for a vehicle. Control programs can be preset (e.g., at the factory or by a distributor or dealer), selected by an operator, or a combination thereof.

Voltage in drive units are regulated by a number of different techniques and mechanisms. In one embodiment, voltage to various drive units is controlled using pulse width modulation.

FIG. 10 depicts regenerative braking using an electrically operated clutch according to one embodiment. In 278, a regenerative system is activated (e.g., by tapping a brake pedal). In 280, power to a high speed drive unit is decreased. In 282, a lower speed drive unit is engaged (e.g., by engaging an electric clutch between the drive unit and a drive shaft). In 284, inertial power from the drive shaft is used to drive a motor in the lower speed drive unit to generate electrical current to recharge one or more electrical power sources in the system. In 288, a brake device (e.g., a disc brake) is applied. In 290, the vehicle comes to a stop.

In some embodiments, different speed drive units of a vehicle drive different wheels, axles, or both. For example, a lower speed drive unit may drive one or both front wheels of a vehicle, while a higher speed. The drive units can be operated to maintain both drive units in a desired efficiency range.

Figure 11:
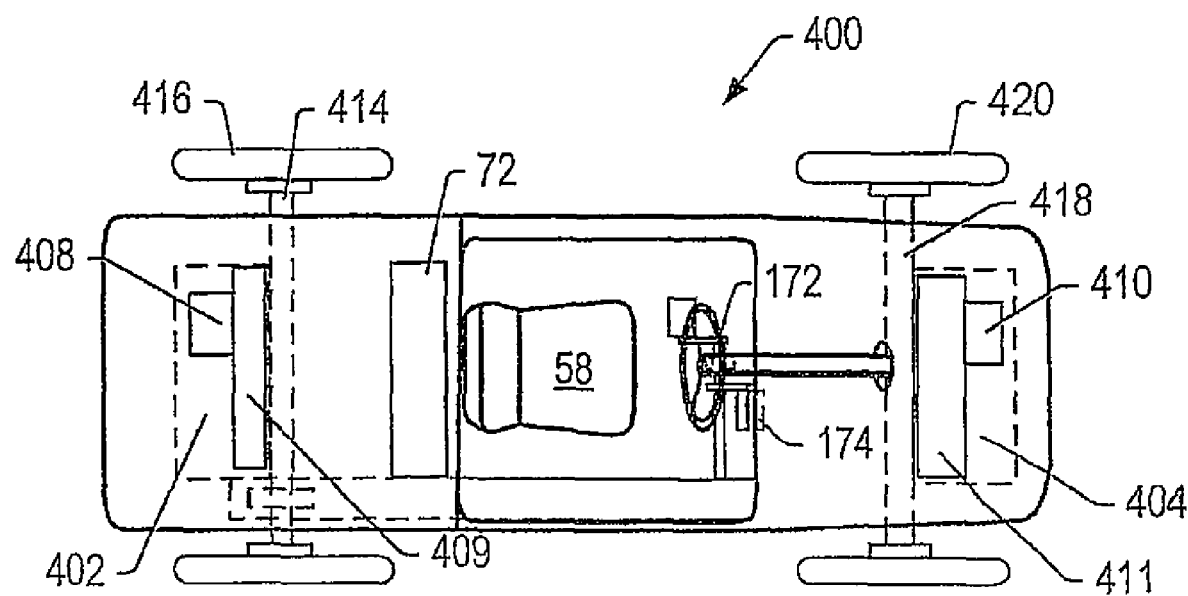
FIG. 11 depicts a vehicle having different speed drive units driving different wheels according to one embodiment.

FIG. 11 depicts a vehicle having different speed drive units driving different wheels according to one embodiment. Vehicle 400 includes rear drive system 402 and front drive system 404. Rear drive system 402 includes high speed drive unit 408 and shaft assembly 409. Shaft assembly 409 can include appropriate shafts, chains, sprockets, gears, and the like, to transmit power from high speed drive unit 408 to axle 414. Wheels 416 are coupled to axle 414. Front drive system 404 includes low speed drive unit 410 and shaft assembly 411. Shaft assembly 411 includes appropriate chains, sprockets, gears, and the like, to transmit power from low speed drive unit 410 to axle 418. Wheels 420 are coupled to axle 418. High speed drive unit 408 and low speed drive unit 410 is operated to maintain the efficiency of each of the drive units in a predetermined range. In an alternate embodiment, a high speed drive unit is placed on the front of the vehicle and a low speed drive unit is placed on the rear of the vehicle.

In an embodiment, an electric vehicle includes a frame; at least two wheels configured for rotation relative to the frame; a drive shaft coupled to at least one of the wheels; a lower speed electric drive unit coupled to the drive shaft and configured to drive the drive shaft within a first speed range; at least one higher speed electric drive unit coupled to the drive shaft and configured to drive the drive shaft within a second speed range, the maximum of the second speed range being higher than the maximum of the first speed range; and an electronic control unit configured to automatically adjust the voltage applied to at least one of the higher speed electric drive units to maintain the efficiency of the higher speed electric drive unit within a predetermined efficiency range during operation of the higher speed drive unit. An average voltage is automatically adjusted as a function of vehicle speed or drive shaft speed. A clutch is configured to automatically disengage the lower speed electric drive unit from the drive shaft. The clutch includes a uni-directional device.

In another embodiment, the clutch is an electric clutch. The electric clutch is configured to automatically engage the lower speed electric drive unit with the drive shaft while the higher speed drive unit is driving the drive shaft in the second speed range such that the lower speed electric drive unit is overdriven.

The electronic control unit can be configured to automatically adjust the voltage supplied to the lower speed electric drive units to maintain the efficiency of the lower speed electric drive unit within a predetermined efficiency range during operation of the lower speed drive unit. The electronic control unit is configured to control voltage to the first and second electric drive units, wherein the electric control unit is configured to accelerate the electric vehicle from a standing start to a predetermined speed, wherein accelerating the electric vehicle comprises increasing the voltage to at least one of the higher speed drive units from a first amount to a second amount while the lower speed electric drive unit supplies torque to the drive shaft. The voltage to the higher electric drive unit is increased as a function the speed of the vehicle. In an embodiment, the drive units each comprise a permanent magnet electric motor. In an embodiment, the voltage to the to the higher electric drive unit is increased as a substantially linear function of the speed of the vehicle over at least a portion of the increase in voltage. The lower speed drive unit can automatically disengage from the drive shaft.

In an embodiment, the electrical vehicle further includes a uni-directional device coupled between the lower speed drive unit and the drive shaft. The uni-directional device is configured to transfer torque to the drive shaft when the vehicle is below a predetermined speed.

In an embodiment, at least one of drive units is configurable to regeneratively brake the vehicle.

In an embodiment, a method of operating an electric vehicle includes applying a voltage to a first motor coupled to a drive shaft; applying a voltage to a second motor coupled to the drive shaft while the voltage is being applied to the first motor, wherein the voltage to the second motor is increased from a first voltage level to a second voltage level, wherein the second motor is configured to drive the drive shaft at a higher speed than the first motor; and automatically regulating the voltage applied to the second motor to maintain the second electric motor within a predetermined efficiency range. The voltage is supplied to the first and second motors from a standing start. The average voltage to the second motor is increased at a substantially constant rate. The method can, in some embodiments, include disengaging a clutch when the drive shaft reaches a predetermined speed. Current can be generated with energy from a drive shaft of the vehicle. The voltage can be increased such that the second motor accelerates at a substantially constant rate. Increasing the voltage to the second motor can, in some embodiments, include pulse width modulation. The voltage applied to at least one of the drive units is automatically adjusted a function a vehicle speed.

Various elements and aspects of the processes described herein can be combined, reversed, or omitted. For example, with respect to the deceleration described relative to FIG. 10, application of a brake in 288 may be omitted or occur before 280. Multiple steps or elements of the processes described herein may occur simultaneously. For example, with respect to the acceleration described relative to FIG. 8, 220, 222, and 224 may all occur simultaneously. As another example, information from speed sensors in 226 (see FIG. 9) can be gathered by wheel sensors and received by an ECU continuously or at various times during acceleration.

As used herein, "drive unit" refers to a mechanism or system that imparts motion (e.g., rotation) to a shaft, wheel, gear, sprocket, or other mechanical output device. Suitable drive sources for a drive unit include electric motors, pedal cranks, and hand cranks.

As used herein, "uni-directional drive unit" refers to a drive unit that drives an output device in only one direction. A "uni-directional motor drive unit" refers to a uni-directional drive unit having a motor. A uni-directional drive unit can include a uni-directional rotating device. Examples of uni-directional rotating devices include roller clutches, ratchets, and free-wheel mechanisms.

As used herein, "bi-directional drive unit" refers to a drive unit that drives an output device in at least two directions.

As used herein, a "clutch" includes any device for transmitting rotational power that can be engaged or disengaged or that automatically engages or disengages. A clutch can be friction clutch or a non-friction clutch. Suitable clutches may include centrifugal clutches, disc clutches, sprag clutches, magnetic clutches, roller clutch bearings, and cone clutches.

As used herein, "disengaged" or "disengagement" includes any condition in which a driving element is not transmitting power to a driven element. For example, a uni-directional clutch is engaged in one direction and transmits power in that direction, but is disengaged and does not transmit power in the opposite direction.

As used herein, a "jack-shaft" refers to an intermediate shaft that receives power from at least one source through belts, gearing, or the like, and transmits the power through belts, gearing, or the like to other driven members.

As used herein, "vehicle" includes any apparatus for transporting persons, objects, materials, or other things from one place to another. A vehicle can have any number and combination of wheels, tracks, rollers, skids, or other devices for moving on a surface. In one embodiment, a vehicle has two wheels (e.g., one front and one rear). A vehicle can be directed with a steering wheel, joystick, handlebars, or other control device. Different drive wheels of a vehicle can be commonly controlled by a single control device (e.g., a steering wheel) or by different devices (e.g., a left joystick for a left wheel and a right joystick for a right wheel.) A vehicle can be controlled locally (e.g., by a rider) or remotely. A vehicle may be controlled manually, automatically, or a combination thereof. Vehicles described herein can be used in many applications, including cargo, utility, or transportation. For example, a vehicle may be used as a taxi or tour vehicle. An "electric powered vehicle" is a vehicle that is at least partially driven using electrical power. Electric powered vehicles can be partially driven by sources other than electricity (as with, for a example, a hybrid vehicle).

As used herein, "coupled" includes directly coupled or indirectly coupled. As used herein, "connected" or "connection" includes a direct connection or an indirect connection.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. The words "include", "including", and "includes" mean including, but not limited to.

What is claimed is:

1. An electric powered vehicle comprising:
a frame;
at least two wheels, at least one of which is a drive wheel;
a first drive unit coupled to one of the drive wheels;

a second drive unit coupled to one of the drive wheels, which second drive unit is configured to drive the vehicle at a higher speed than the first drive unit;

a clutch configured to automatically disengage the first drive unit from the drive wheel when the speed of the drive wheel exceeds the speed of the first drive unit;

a jackshaft continuously rotationally coupled with the at least one drive wheel, wherein the first drive unit is coupled to the jackshaft through the clutch and the second drive unit is continuously rotationally coupled to the jackshaft; and an electronic control unit configured to apply a voltage to the first drive unit and apply a voltage to the second drive unit to drive the vehicle from a standing start up to first speed, and apply a voltage to the second drive unit to drive the vehicle up to a second speed that is higher than the first speed.

2. The electric powered vehicle of claim 1, wherein the electronic control unit is configured to automatically adjust the voltage supplied to the second drive unit to maintain the efficiency of the second drive unit within a predetermined efficiency range during operation of the second drive unit.

3. The electric powered vehicle of claim 1, wherein the first drive unit and the second drive unit are both configured to drive the same drive wheel.

4. The electric powered vehicle of claim 1, wherein the clutch comprises a uni-directional device.

5. The electric powered vehicle of claim 4, wherein the clutch is a roller clutch bearing.

6. The electric powered vehicle of claim 1, wherein at least one of the drive units comprises a permanent magnet electric motor.

7. The electric powered vehicle of claim 1, wherein the clutch is a uni-directional clutch wherein the first drive unit is rotationally coupled to the at least one drive wheel when the first drive unit is driving the at least one drive wheel and the first drive unit is rotationally un-coupled to the at least one drive wheel when the first drive unit is not driving the at least one drive wheel.

8. The electric powered vehicle of claim 7, wherein the second drive unit is continuously rotationally coupled to the jackshaft by a belt.

9. The electric powered vehicle of claim 7, wherein the first drive unit is coupled to the jackshaft through a planetary gear set to reduce RPM and then through a sprocket and chain set to further reduce RPM.

10. The electric powered vehicle of claim 1, wherein at low vehicle speed, higher power is applied to the first drive unit and lower power is applied to the second drive unit.

11. The electric powered vehicle of claim 10, wherein at vehicle speeds exceeding the first speed, the power provided to the first drive unit is removed and power to the second drive unit is continued to drive the vehicle to a desired top speed.

* * * * *